(12) United States Patent
Shin et al.

(10) Patent No.: US 12,278,889 B2
(45) Date of Patent: Apr. 15, 2025

(54) ELECTRONIC APPARATUS USING HOMOMORPHIC CIPHER AND METHOD THEREOF

(71) Applicant: CRYPTO LAB INC., Seoul (KR)

(72) Inventors: Junbum Shin, Seoul (KR); Jung Hee Cheon, Seoul (KR); Unyoung Kim, Seoul (KR); Dongyeon Hong, Seoul (KR)

(73) Assignee: CRYPTO LAB INC., Seoul (KR)

( * ) Notice: Subject to any disclaimer, the term of this patent is extended or adjusted under 35 U.S.C. 154(b) by 279 days.

(21) Appl. No.: 18/191,292

(22) Filed: Mar. 28, 2023

(65) Prior Publication Data

US 2023/0318803 A1     Oct. 5, 2023

(30) Foreign Application Priority Data

Mar. 28, 2022   (KR) .................. 10-2022-0038076

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC .............................. H04L 9/008; H04L 9/0618
(Continued)

(56) References Cited

U.S. PATENT DOCUMENTS

2016/0072623 A1* 3/2016 Joye ...................... H04L 9/3255
380/28
2018/0069696 A1 3/2018 Yoo et al.
(Continued)

FOREIGN PATENT DOCUMENTS

KR      101659226 B1    9/2016
KR      20160122471 A   10/2016
(Continued)

OTHER PUBLICATIONS

Notice of Allowance issued for Korean Patent Application No. 10-2022-0038076 filed on Mar. 28, 2022 on behalf of Crypto Lab Inc. Issuance Date Sep. 25, 2024. 12 pages (English translation + original).

*Primary Examiner* — Zi Ye
(74) *Attorney, Agent, or Firm* — Steinfl + Bruno LLP (57) ABSTRACT

An electronic apparatus is disclosed. The electronic apparatus includes a memory configured to store a homomorphic ciphertext including a tag and a program operating in the electronic apparatus, a user interface, and a processor, and the tag includes type information for original data of the homomorphic ciphertext, and is set, based on computation for the homomorphic ciphertext being performed, such that the tag included in the homomorphic ciphertext used in the computation is included in even a computation result value generated by the computation being performed, and the processor is configured to generate, based on receiving a computation request for the homomorphic ciphertext from the program, a computation result value by performing computation for the homomorphic ciphertext, check the type information for the original data of the homomorphic ciphertext used in the computation based on the tag included in the computation result value, perform decryption of the computation result value, control the user interface to display the checked type information for the original data and the decrypted computation result value, and provide, based on receiving a command to provide data through the user interface, the decrypted computation result value to the program.

9 Claims, 7 Drawing Sheets

(58) Field of Classification Search
USPC .......................................................... 380/28
See application file for complete search history.

(56) References Cited

U.S. PATENT DOCUMENTS

2021/0258141 A1    8/2021  Moon et al.
2022/0094521 A1*   3/2022  Moon ................... G06F 21/602

FOREIGN PATENT DOCUMENTS

KR      20200053225 A     5/2020
WO      2017/177313 A1   10/2017

* cited by examiner

ELECTRONIC APPARATUS USING HOMOMORPHIC CIPHER AND METHOD THEREOF

BACKGROUND

1. Field

The disclosure relates to an electronic apparatus using a homomorphic cipher and a method thereof, and more particularly to an electronic apparatus that provides a program installed in the electronic apparatus for the program to analyze data using a homomorphic ciphertext after encrypting the data stored in the electronic apparatus using the homomorphic cipher, and a method thereof.

2. Description of Related Art

Recently, use of various electronic apparatuses are increasing. Various programs are being operated in the electronic apparatuses, and a program may be set so as to access data stored in the electronic apparatus for operation.

Most programs have authorities for performing communication with an external server to utilize a cloud-based service, and accordingly, in the case of malicious programs, there has been a problem of data stored in the electronic apparatus being leaked outside separately from an intent of a user.

SUMMARY

Accordingly, aspects of the disclosure are to address problems such as those described above, and to provide an electronic that encrypts data stored in an electronic apparatus using a homomorphic cipher, and provide a homomorphic ciphertext to a program for the program to perform an analysis of the homomorphic ciphertext, and a method thereof.

To achieve the aspects described above, according to an embodiment of the disclosure, an electronic apparatus includes a memory configured to store a homomorphic ciphertext including a tag and a program operating in the electronic apparatus, a user interface, and a processor, and the tag includes type information for original data of the homomorphic ciphertext, and is set, based on computation for the homomorphic ciphertext being performed, such that the tag included in the homomorphic ciphertext used in the computation is included in even a computation result value generated by the computation being performed, and the processor is configured to generate, based on receiving a computation request for the homomorphic ciphertext from the program, a computation result value by performing computation for the homomorphic ciphertext, check the type information for the original data of the homomorphic ciphertext used in the computation based on the tag included in the computation result value, perform decryption of the computation result value, control the user interface to display the checked type information for the original data and the decrypted computation result value, and provide, based on receiving a command to provide data through the user interface, the decrypted computation result value to the program.

According to an embodiment of the disclosure, the electronic apparatus may further include a communication device, and the processor may be configured to control, based on receiving a request from the program to transmit the homomorphic ciphertext to an external server, the communication device to transmit the homomorphic ciphertext to the external server, and provide, based on receiving the computation result value generated by the computation for the homomorphic ciphertext being performed from the external server, the received computation result value to the program.

The memory may include a first area at which the program is stored and a second area inaccessible to the program, and a secret key for the homomorphic ciphertext may be stored in the second area.

The type information for the original data may include at least one from among personal information, health information, financial information, and identification information.

According to an embodiment of the disclosure, a data providing method of an electronic apparatus includes storing a homomorphic ciphertext including a tag and a program operating in the electronic apparatus, generating, based on receiving a computation request for the homomorphic ciphertext from the program, a computation result value by performing computation for the homomorphic ciphertext, checking type information for original data of the homomorphic ciphertext used in the computation based on a tag included in the computation result value, performing decryption of the computation result value, controlling the user interface to display the checked type information for the original data and the decrypted computation result value, and providing, based on receiving a command to provide data through the user interface, the decrypted computation result value to the program, and the tag includes the type information for the original data of the homomorphic ciphertext, and is set, based on the computation for the homomorphic ciphertext being performed, such that the tag included in the homomorphic ciphertext used in the computation is included in even a computation result value generated by the computation being performed.

The data providing method may further include controlling, based on receiving a request from the program to transmit the homomorphic ciphertext to an external server, a communication device to transmit the homomorphic ciphertext to the external server, receiving the computation result value generated by a computation for the homomorphic ciphertext being performed from the external server, and providing the received computation result value to the program.

The storing may include storing the program at a first area of a memory, and storing a secret key for the homomorphic ciphertext at a second area of the memory inaccessible to the program.

The type information for the original data may include at least one from among personal information, health information, financial information, and identification information.

According to various embodiments of the disclosure as described above, a data leak by a malicious program may be prevented by having the program use the homomorphic ciphertext to perform an analysis of the data. In addition, when performing decryption of the computation result value, the type information for the original data may be displayed together so that the user is able to check how the computation result value is calculated using which information.

BRIEF DESCRIPTION OF THE DRAWINGS

The above and/or other aspects of the disclosure are more apparent by describing certain embodiments of the disclosure with reference to the accompanying drawings, in which.

DETAILED DESCRIPTION

The disclosure will be described in detail below with reference to accompanying drawings. An information (data) transmitting process performed in the disclosure may be applied with encryption/decryption if necessary, and all expressions describing the information (data) transmitting process in the disclosure and in the claims should be interpreted to include encryption/decryption even if it is not specifically mentioned. Expressions in forms such as "transmit (transfer) from A to B" or "receive A from B" in the disclosure may include transmitting (transferring) or receiving with another medium included therebetween, and not necessarily describe transmitting (transferring) or receiving directly from A to B only.

In the disclosure, an expression "have," "may have," "include," "may include," or the like, indicates existence of a corresponding feature (for example, a numerical value, a function, an operation, a component such as a part, or the like), and does not exclude existence of an additional feature.

Expressions "first," "second," or the like, used in the disclosure may indicate various components regardless of a sequence and/or importance of the components, will be used only in order to distinguish one component from the other components, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component). On the other hand, in case that any component (for example, the first component) is mentioned to be "directly coupled to" or "directly connected to" another component (for example, the second component), it is to be understood that still other component (for example, the third component) is not present between any component and another component.

An expression "configured (or set) to" used in the disclosure may be replaced by an expression "suitable for," "having the capacity to," "designed to," "adapted to," "made to," or "capable of" depending on a situation. The expression "configured (or set) to" may not necessarily indicate "specifically designed to" in hardware. Instead, an expression a device "configured to" in any situation may indicate that the device may "perform-" together with another device or component. For example, "a processor configured (or set) to perform A, B, and C" may be a dedicated processor (for example, an embedded processor) for performing the corresponding operations or a generic-purpose processor (for example, a central processing unit (CPU) or an application processor) that may perform the corresponding operations by executing one or more software programs stored in a memory device.

In describing the disclosure, the order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step. Further, in the disclosure, expressions such as "A or B" not only refers to any one of A and B selectively, but also may be defined as including both A and B. In addition, the term "include" may have a comprehensive meaning as further including another element in addition to the elements listed as included.

In the disclosure, only essential elements necessary in describing the disclosure have been described, and elements not related to the nature of the disclosure have been omitted. Further, the disclosure is not to be construed in an exclusive sense including only the recited elements, but to be interpreted in a non-exclusive sense where other elements may be included.

The disclosure may be performed by an electronic computation device such as, for example, and without limitation, a computer capable of electronic computations, a server, a mobile device such as a smartphone, and the like, and mathematical computations and calculations in each step of the disclosure which will be described below may be implemented as a computation according to an execution of a computer program by a publically known coding method to perform the corresponding computation or calculation and/or a coding appropriately designed for the disclosure. The computer program executing the disclosure may be stored in a computer-readable storage medium.

Further, in the disclosure, the term "value" may be defined in a broad concept that not only includes a scalar value, but also all values that can be represented with an equation such as a vector, a matrix, and a polynomial.

In the disclosure, the meaning of obtaining a predetermined value by performing computations such as an encryption, hash, or the like for a specific value may be defined as including not only the corresponding specific value, but also computations such as encryption, hash, or the like for a modified value of the corresponding specific value (e.g., another value calculated through a process of additionally performing computation of the predetermined value to the specific value or modifying the corresponding specific value according to a predetermined rule).

Various embodiments of the disclosure will be described in detail below using the accompanied drawings.

Figure 1:
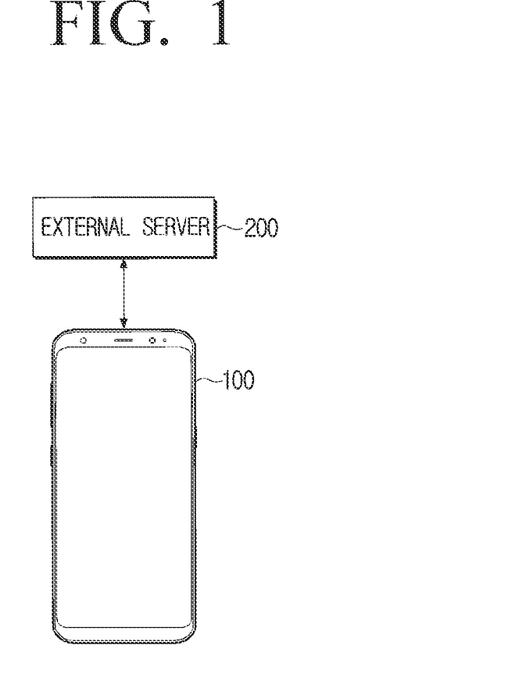
FIG. 1 is a diagram illustrating an operation of an electronic apparatus according to an embodiment of the disclosure.

FIG. 1 is a diagram illustrating an operation of an electronic apparatus according to an embodiment of the disclosure.

Referring to FIG. 1, an electronic apparatus 100 may be implemented as a device of various forms such as, for example, and without limitation, a smartphone, a tablet, a personal computer (PC), a laptop computer, a server and the like, and may be implemented in a form of a home appliance applied with an IoT function.

The electronic apparatus 100 may be installed with programs of various types, and the electronic apparatus 100 may perform various jobs according to a program operation. In an example, a program may perform data analysis using data stored in the electronic apparatus 100.

A user may select data to be provided to a program from among the data stored in the electronic apparatus 100. The electronic apparatus 100 may provide selected data to the program after performing homomorphic encryption. In this case, a decryption key for the homomorphic encryption may be stored in a safe place within the electronic apparatus 100.

Data selection by the user may be carried out for each individual data. However, the embodiment is not limited thereto, and the user may select a data type and set so that data corresponding to the corresponding type is homomorphic encrypted and provided to the program.

The program of the electronic apparatus 100 may perform data analysis using a homomorphic ciphertext which was provided. The data analysis by the program may be performed within the electronic apparatus 100, and the data analysis may also be performed by an external server 200.

The external server 200 may perform, based on receiving the homomorphic ciphertext and computation request from the electronic apparatus 100, computation for the received homomorphic ciphertext, and transmit a computation result value generated by the computation being performed to the electronic apparatus 100. The electronic apparatus 100 may provide the computation result value received from the external server 200 to the program.

The electronic apparatus 100 may perform homomorphic encryption of the data while including a tag in the homomorphic ciphertext. The tag may include type information of original data of the homomorphic ciphertext. The type information may be information that summarized a content of the original data, and may be information divided into a plurality of categories according to an attribute of the original data.

According to an example, the type information may include personal information, health information, financial information, identification information, position information, sensitive information, content information, search information, spending information, and the like, but is not limited thereto.

According to an example, the personal information may include a name, telephone number, an address, and the like. The health information may include a state of one's health, medication that is being taken, exercise data, and the like. The financial information may include a card number, an account number, credit information, and the like. The identification information may include an account number, a client number, a device number, and the like. The position information may include Global Positioning System (GPS) information, moving route information, and the like. The sensitive information may include ethnicity, pregnancy, birth, religious information, and the like. The content information may include an e-mail, a message, a photograph, a video, an audio, and the like. The search information may include website search information, and the like.

If the original data has a tag that includes the type information, the homomorphic ciphertext for the original data may also include the corresponding tag.

The tag included in the homomorphic ciphertext may be set, based on the computation for the homomorphic ciphertext being performed, such that the tag included in the homomorphic ciphertext used in the computation is included in even the computation result value generated by the computation being performed. In an example, a tag of the computation result value resulting from performing computation of a homomorphic ciphertext having a tag "name" and a homomorphic ciphertext having a tag "medical" may have a tag "name"||"medical" which is a form that added each tag. Here, ||symbol may refer to combining and showing a series of elements as one element.

The tag included in the homomorphic ciphertext may be included in the homomorphic ciphertext without a separate encryption, and without being limited thereto, the tag may also be included in the homomorphic ciphertext by being homomorphic encrypted.

The electronic apparatus 100 may display how the computation result value is generated by using data of which type to the user when performing decryption for the computation result value using the tag included in the homomorphic ciphertext. In an example, the electronic apparatus 100 may perform decryption of the computation result value when a decryption request for the computation result value is received from the program, and provide the user with the decrypted computation result value and type information for the data used in the computation.

Accordingly, the user may determine whether to provide the computation result value decrypted based on the type information for the original data to the program even if the computation result value which received the decryption request is in an unrecognizable form or if too much data is included.

Figure 2:
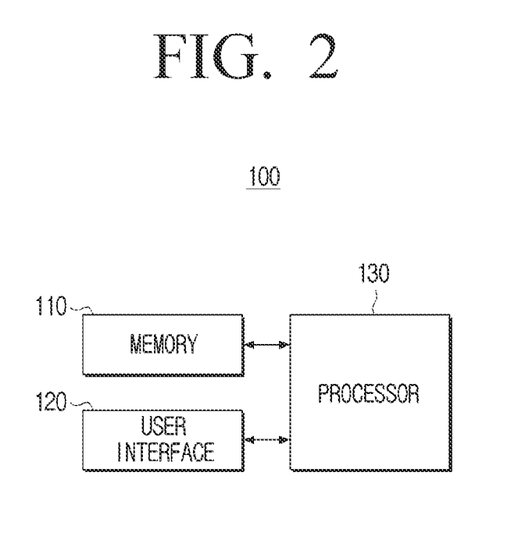
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a memory 110, a user interface 120, and a processor 130. The electronic apparatus 100 described above may be a variety of devices such as, for example, and without limitation a personal computer (PC), a notebook, a smartphone, a tablet, a server, and the like.

The memory 110 may be an element for storing various programs, data, and instructions necessary in an operation of the electronic apparatus 100. In FIG. 2, the memory 110 has been shown as one separate from the processor 460, but a number and type, position, and the like of the memory may be variously implemented according to an embodiment. Specifically, the memory 110 may be implemented to various forms such as, for example, and without limitation, a RAM or ROM, a buffer, a cache, a flash memory, a HDD, an external memory, a memory card, and the like, and the memory is not limited to any one of them.

The memory 110 may store a program that operates in the electronic apparatus 100 and a homomorphic ciphertext. The homomorphic ciphertext that is stored in the memory 110 may be a homomorphic ciphertext that includes a tag. In addition thereto, the memory 110 may store a public key and a secret key necessary in the homomorphic encryption and decryption, and in case the electronic apparatus 100 directly generates these keys, store various parameters necessary in generating the keys. In addition, the memory 110 may store a result value of computation which is received from the external server 200 through a communication device 140 which will be described below.

The user interface 120 may display a user interface window for displaying a function supported by the electronic apparatus 100, and receive a selection of a function of the electronic apparatus 100 and control command for the corresponding function from the user.

The user interface 120 may include a monitor (or display) such as, for example, and without limitation, a liquid crystal display (LCD), organic light emitting diodes (OLED), micro LED and the like to display the user interface window, and may be implemented as a touch screen.

The user interface 120 may display a message (or information) requesting the selection of data which is to be to be homomorphic encrypted and provided to the program. The user may select data which is to be to be homomorphic encrypted and provided to the program from among data stored in the electronic apparatus 100 through the user interface 120. The homomorphic encrypted data may be stored in the memory 110.

Data selection may be carried for each individual data, and data corresponding to the corresponding type may be selected by selecting the data type. The data selection may be directly selected by the user, and may be automatically selected according to implementation. In an example, data requiring security of a high level may be automatically selected even if not directly selected by the user.

The user interface 120 may display information about the computation result value to be provided to the program. The information about the computation result value may include a value that decrypted the computation result value, data size, and a tag included in the computation result value, and also include a program name that requested the decryption.

The user may check information about the computation result value displayed in the user interface 120 and determine whether to provide the computation result value to the program. Accordingly, if the computation result value is in an unrecognizable form or too much data is included, or if important information is included, the user may not provide the above to the program.

The user interface 120 may receive, from the user, selection of a function of the electronic apparatus 100 and control command for the corresponding function. The user interface 120 may include a keyboard, a mouse, a touch pad, or the like, and may include a microphone for receiving the user voice.

The processor 130 may control the overall operation of the electronic apparatus 100. For example, the processor 130 may control the overall operation of the electronic apparatus 100 by executing at least one instruction stored in the memory 110. The processor 130 described above may be configured as a single device such as a central processing unit (CPU) and an application-specific integrated circuit (ASIC), and may be configured as a plurality of configurations such as the CPU, a graphics processing unit (GPU), and the like.

The processor 130 may generate, based on receiving a computation request for the homomorphic ciphertext from the program that is operated in the electronic apparatus 100, a computation result value by performing computation for the homomorphic ciphertext. The tag included in the computation result value may include the tag included in the homomorphic ciphertext used in the computation as described above.

The processor 130 may check, based on receiving the decryption request for the computation result value from the program, the type information for the original data of the homomorphic ciphertext used in the computation based on the tag included in the computation result value. Further, the computation result value may be decrypted and the user interface 120 may be controlled to display the decrypted computation result value and the checked type information for the original data.

The processor 130 may provide, based on receiving a command to provide data through the user interface 120, the decrypted computation result value to the program.

Figure 3:
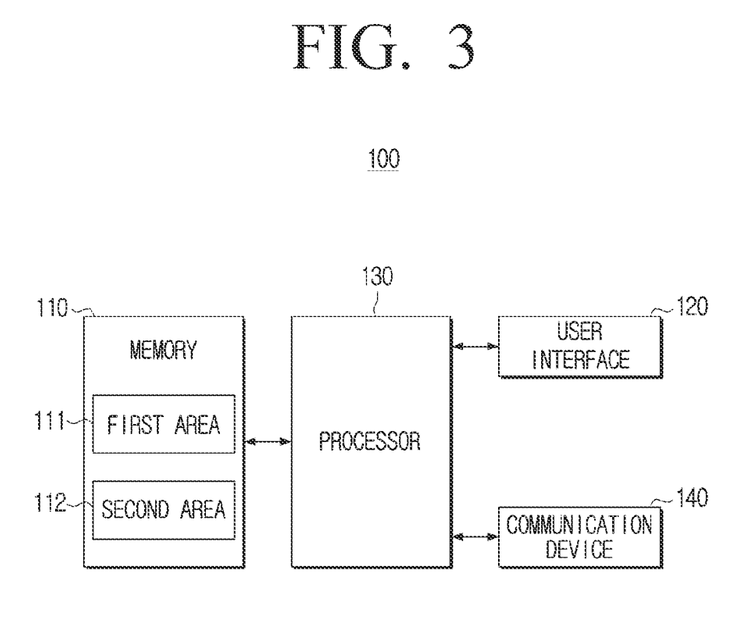
FIG. 3 is a block diagram illustrating a detailed configuration of an electronic apparatus according to an embodiment of the disclosure.

FIG. 3 is a block diagram illustrating a detailed configuration of an electronic apparatus according to an embodiment of the disclosure.

Referring to FIG. 3, the electronic apparatus 100 may further include a communication device 140. the memory 110 may include a first area 111 and a second area 112.

The communication device 140 may be a configuration for connecting the electronic apparatus 100 with the external server 200. The communication device 140 may not only be in a form that can connect to an external server through a local area network (LAN) and the internet, but also in a form that can connect through a universal serial bus (USB) or a wireless communication (e.g., wireless fidelity (WiFi) 802.11a/b/g/n, near field communication (NFC), Bluetooth) port. The communication device 140 described above may be referred to as a transceiver.

The communication device 140 may provide various signals and data received from the external server to the processor 130, and transmit the various signals and data to various external servers according to the control of the processor 130. In an example, the processor 130 may control, based on receiving a request from the program to transmit the homomorphic ciphertext to the external server 200, the communication device 140 to transmit the homomorphic ciphertext to the external server 200. The communication device 140 may receive, from the external server 200, the computation result value generated by a computation for the homomorphic ciphertext being performed, and provide the received computation result value to the processor 130. The processor 130 may provide the received computation result value to the program, and store in the memory 110.

The memory 110 may include the first area 111 at which the program operating in the electronic apparatus 100 is stored and the second area 112 which is not accessible to the program. The first area 111 and the second area 112 of the memory 110 may be implemented as areas divided in terms of hardware, and without being limited thereto, may be implemented as areas divided in terms of software within one memory 110.

The homomorphic encrypted data may be stored in the first area 111 of the memory 110 so as to be accessible to the program. The secret key used in the homomorphic encryption may be stored in the second area 112 so as to be inaccessible to the program. Accordingly, the data stored in the electronic apparatus 100 may be prevented from being decrypted by a malicious program.

Figure 4:
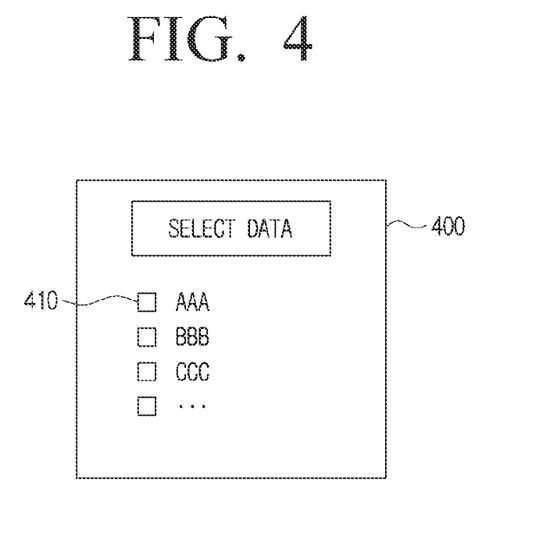
FIG. 4 and FIG. 5 are diagrams illustrating selecting of data to be converted to a homomorphic ciphertext according to an embodiment of the disclosure.
Figure 5:
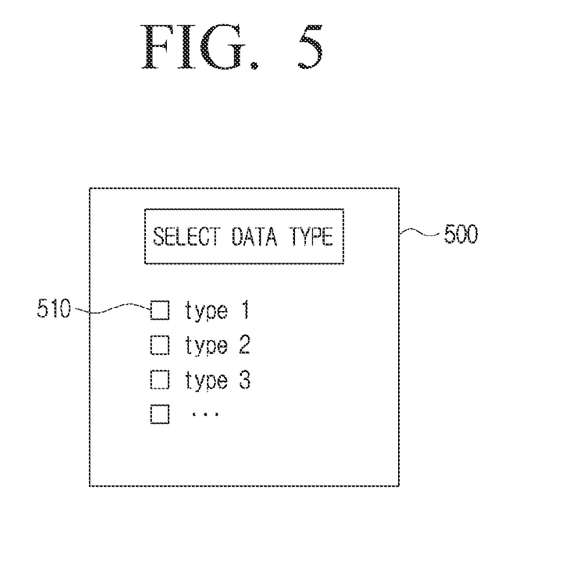

FIG. 4 and FIG. 5 are diagrams illustrating selecting of data to be converted to a homomorphic ciphertext according to an embodiment of the disclosure.

Referring to FIG. 4 according to an example, the electronic apparatus 100 may display a data list 410 through a screen 400 of the user interface 120 based on receiving, from the user, input of a homomorphic cipher protect command for important data from among data stored in the memory 110.

In the data list 410, content which can identify data such as, for example, and without limitation, name information, attribute information, size information, and the like of data may be displayed in a list form.

The user may select respective data displayed in the data list 410 and perform homomorphic encryption, and the electronic apparatus 100 may provide the homomorphic encrypted data to the program.

Referring to FIG. 5 according to an example, the electronic apparatus 100 may display a data type list 510 through a screen 500 of the user interface 120.

The electronic apparatus 100 may perform, based on the user selecting the data type displayed in the data type list 510, homomorphic encryption of data corresponding to the selected data type. Then, the electronic apparatus 100 may provide the homomorphic encrypted data to the program.

The data type may include personal information, health information, financial information, identification information, position information, sensitive information, content information, search information, spending information, and the like, but is not limited thereto.

The electronic apparatus 100 may perform, based on new data corresponding to the selected data type being input, homomorphic encryption prior to providing to the program for even the input new data.

Figure 6:
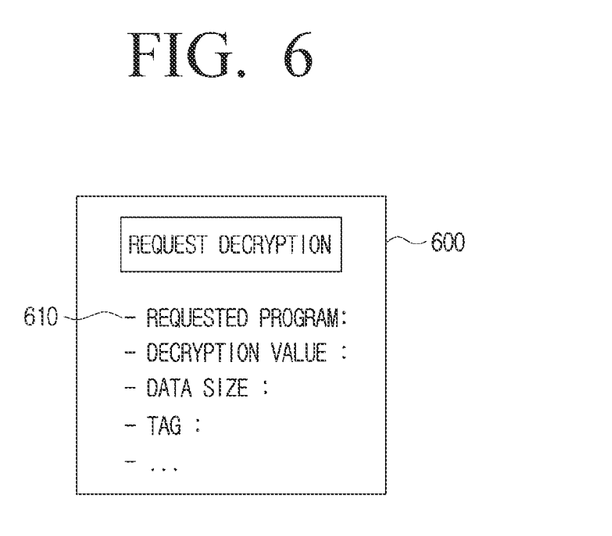
FIG. 6 is a diagram illustrating a decryption request for a computation result value of a program according to an embodiment of the disclosure.

FIG. 6 is a diagram illustrating a decryption request for a computation result value of a program according to an embodiment of the disclosure.

Referring to FIG. 6, the electronic apparatus 100 may display, based on receiving the decryption request for the computation result value from the program, a decryption request message to the user through a screen 600 of the user interface 120.

In the decryption request message, content associated with data decryption 610 may be included. In an example, a program that requested decryption, the decrypted computation result value, a data size of the decrypted computation result value, a tag included in the computation result value, and the like may be included.

The user may check the content associated with decryption 610, and if the decrypted computation result value is provided to the program, a command to provide data may be input through the user interface 120. The electronic apparatus 100 may provide the decrypted computation result value to the program based on the command to provide data being input.

The user may not provide, if the requested program is suspected as a malicious program by checking the content associated with decryption 610, if the decryption value is in an unrecognizable form or if too much data is included, or if the data type used in the computation is a type that requires security, the decrypted computation result value to the program.

Figure 7:
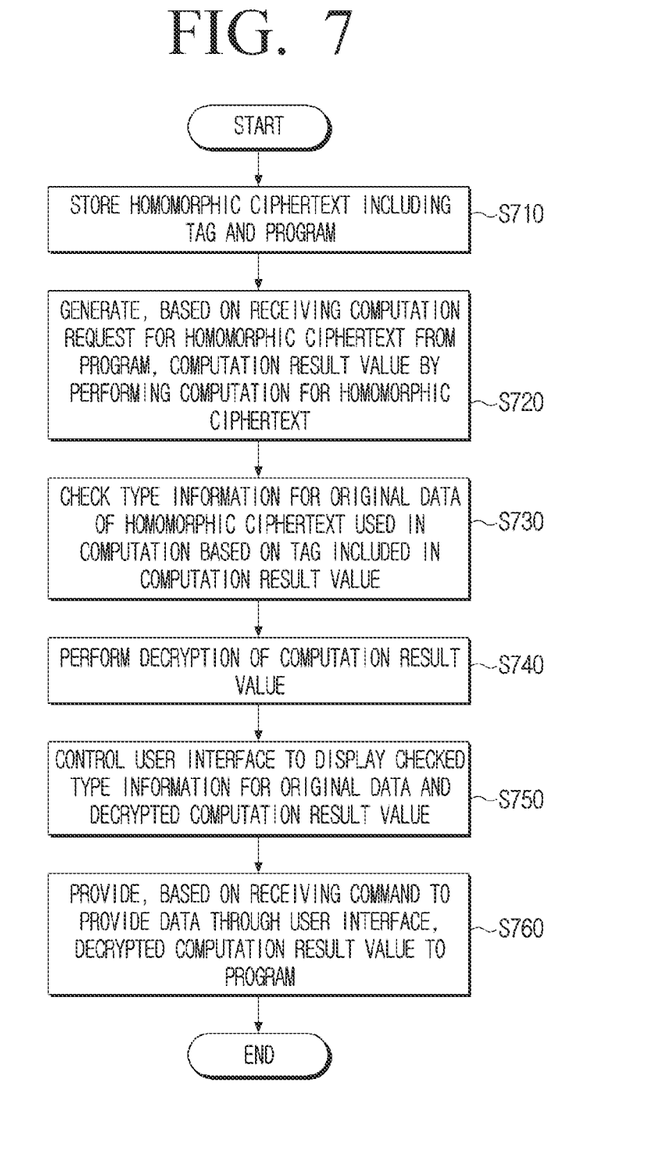
FIG. 7 is a flowchart illustrating a data providing method of an electronic apparatus according to an embodiment of the disclosure.

FIG. 7 is a flowchart illustrating a data providing method of an electronic apparatus according to an embodiment of the disclosure.

Referring to FIG. 7, the data providing method of the electronic apparatus may include storing the homomorphic ciphertext including the tag and the program operating in the electronic apparatus (S710). The tag may include the type information for the original data of the homomorphic ciphertext. In addition, the tag may be set, based on the computation for the homomorphic ciphertext being performed, such that the tag included in the homomorphic ciphertext used in the computation is included in even the computation result value generated by the computation being performed.

Based on receiving the computation request for the homomorphic ciphertext from the program, the computation result value may be generated by performing computation for the homomorphic ciphertext (S720).

Based on receiving the decryption request for the computation result value from the program, the type information for the original data of the homomorphic ciphertext used in the computation may be checked based on the tag included in the computation result value (S730). Then, decryption may be performed of the computation result value (S740).

The user interface may be controlled to display the checked type information for the original data and the decrypted computation result value (S750), and the decrypted computation result value may be provided to the program based on receiving the command to provide data through the user interface (S760).

Because descriptions associated with the type information of the original data and the decryption of the computation result value have been described above, redundant descriptions thereof will be omitted.

The method of FIG. 7 may be performed in the electronic apparatus 100 having the configurations shown in FIG. 2, but is not necessarily limited thereto, and may be performed in other devices of various configurations.

Meanwhile, a simulation method according to the various embodiments described above may be implemented in a form of a program code to perform each of the steps, and may be stored in a recording medium and distributed. In this case, a device installed with the recording medium may perform operations such as, for example, and without limitation, the above-described encryption or ciphertext processing, and providing data to the program, and the like.

The recording medium described above may be a computer-readable medium of various types such as, for example, and without limitation, a ROM, a RAM, a memory chip, a memory card, an external hard disc drive, a hard disc drive, a CD, a DVD, a magnetic disk or a magnetic tape, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

Meanwhile, the term "part" or "module" used in the disclosure may include a unit including hardware, software or firmware, and may be used interchangeably with the term, for example, logic, a logic block, a component or a circuit. The "part" or "module" may be an integrally formed component, or a minimum unit or part performing one or more functions. For example, the module may include an application-specific integrated circuit (ASIC).

The various embodiments of the disclosure may be implemented by software including an instruction stored in a machine-readable storage medium (e.g., computer-readable storage medium). The machine may be a device which may evoke a stored instruction word from the storage medium, and operated based on the evoked instruction word, and may include an electronic apparatus (e.g., electronic apparatus 300) according to the disclosed embodiments. In case that the instruction is executed by the processor, the processor may directly perform a function corresponding to the instruction or other components may perform the function corresponding to the instruction under a control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

According to still another embodiment, the method disclosed in the various examples of the disclosure may be included and provided in a computer program product. The computer program product may be traded as a product between a seller and a purchaser. The computer program product may be distributed in the form of a machine-readable storage medium (for example, a compact disc read only memory (CD-ROM)) or online through an application store (for example, PlayStore™). In case of the online distribution, at least portions of the computer program product may be at least temporarily stored or temporarily provided in a storage medium such as a memory of a server of a manufacturer, a server of an application store or a relay server.

Each of components (for example, modules or programs) in the various examples may include a single entity or a plurality of entities, and some of the corresponding sub-components described above may be omitted or other sub-components may be further included in the various examples. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

What is claimed is:

1. An electronic apparatus, comprising:
   a memory configured to store a homomorphic ciphertext comprising a tag and a program operating in the electronic apparatus;
   a user interface; and
   a processor,
   wherein the tag comprises type information for original data of the homomorphic ciphertext, and is set, based on computation for the homomorphic ciphertext being performed, such that the tag comprised in the homomorphic ciphertext used in the computation is comprised in even a computation result value generated by the computation being performed, and
   the processor is configured to generate, based on receiving a computation request for the homomorphic ciphertext from the program, a computation result value by performing computation for the homomorphic ciphertext, check the type information for the original data of the homomorphic ciphertext used in the computation based on the tag comprised in the computation result value, perform decryption of the computation result value, control the user interface to display the checked type information for the original data and the decrypted computation result value, and provide, based on receiving a command to provide data through the user interface, the decrypted computation result value to the program.

2. The electronic apparatus of claim 1, further comprising:
   a communication device,
   wherein the processor is configured to
   control, based on receiving a request from the program to transmit the homomorphic ciphertext to an external server, the communication device to transmit the homomorphic ciphertext to the external server, and provide, based on receiving the computation result value generated by the computation for the homomorphic ciphertext being performed from the external server, the received computation result value to the program.

3. The electronic apparatus of claim 1, wherein the memory comprises:
   a first area at which the program is stored; and
   a second area inaccessible to the program, and
   a secret key for the homomorphic ciphertext is stored in the second area.

4. The electronic apparatus of claim 1, wherein
   the type information for the original data comprises at least one from among personal information, health information, financial information, and identification information.

5. A data providing method of an electronic apparatus, comprising:
   storing a homomorphic ciphertext comprising a tag and a program operating in the electronic apparatus;
   generating, based on receiving a computation request for the homomorphic ciphertext from the program, a computation result value by performing computation for the homomorphic ciphertext;
   checking type information for original data of the homomorphic ciphertext used in the computation based on a tag comprised in the computation result value;
   performing decryption of the computation result value;
   controlling the user interface to display the checked type information for the original data and the decrypted computation result value; and
   providing, based on receiving a command to provide data through the user interface, the decrypted computation result value to the program,
   wherein the tag comprises the type information for the original data of the homomorphic ciphertext, and is set, based on the computation for the homomorphic ciphertext being performed, such that the tag comprised in the homomorphic ciphertext used in the computation is comprised in even a computation result value generated by the computation being performed.

6. The method of claim 5, further comprising:
   controlling, based on receiving a request from the program to transmit the homomorphic ciphertext to an external server, a communication device to transmit the homomorphic ciphertext to the external server;
   receiving the computation result value generated by a computation for the homomorphic ciphertext being performed from the external server; and
   providing the received computation result value to the program.

7. The method of claim 5, wherein the storing comprises:
   storing the program at a first area of a memory; and
   storing a secret key for the homomorphic ciphertext at a second area of the memory inaccessible to the program.

8. The method of claim 5, wherein
   the type information for the original data comprises at least one from among personal information, health information, financial information, and identification information.

9. A non-transitory computer-readable recording medium comprising a program for executing a data providing method of an electronic apparatus, the data providing method comprising:
   storing a homomorphic ciphertext comprising a tag and a program operating in the electronic apparatus;
   generating, based on receiving a computation request for the homomorphic ciphertext from the program, a computation result value by performing computation for the homomorphic ciphertext;
   checking type information for original data of the homomorphic ciphertext used in the computation based on a tag comprised in the computation result value;
   performing decryption of the computation result value;

controlling the user interface to display the checked type information for the original data and the decrypted computation result value; and providing, based on receiving a command to provide data through the user interface, the decrypted computation result value to the program, wherein the tag comprises the type information for the original data of the homomorphic ciphertext, and is set, based on the computation for the homomorphic ciphertext being performed, such that the tag comprised in the homomorphic ciphertext used in the computation is comprised in even a computation result value generated by the computation being performed.

* * * * *